US009884623B2

(12) United States Patent
Fasola et al.

(10) Patent No.: US 9,884,623 B2
(45) Date of Patent: Feb. 6, 2018

(54) METHOD FOR IMAGE-BASED VEHICLE LOCALIZATION

(71) Applicant: GM GLOBAL TECHNOLOGY OPERATIONS LLC, Detroit, MI (US)

(72) Inventors: Juan Fasola, San Francisco, CA (US); Stuart Glaser, San Francisco, CA (US); Elliot Branson, San Francisco, CA (US); Kyle Vogt, San Francisco, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/209,088

(22) Filed: Jul. 13, 2016

(65) Prior Publication Data

US 2017/0015317 A1 Jan. 19, 2017

Related U.S. Application Data

(60) Provisional application No. 62/191,796, filed on Jul. 13, 2015.

(51) Int. Cl.
*B60W 30/12* (2006.01)
*G06K 9/00* (2006.01)
(Continued)

(52) U.S. Cl.
CPC ............ *B60W 30/12* (2013.01); *B60W 40/10* (2013.01); *G01C 21/165* (2013.01);
(Continued)

(58) Field of Classification Search
CPC ..... B62D 15/025; B60W 30/10; B60W 30/12; G05D 1/0231; G05D 1/0234;
(Continued)

(56) References Cited

U.S. PATENT DOCUMENTS 5,790,403 A * 8/1998 Nakayama ........... G05D 1/0246
340/435
6,005,492 A * 12/1999 Tamura ................. B60Q 9/008
180/169

(Continued)

FOREIGN PATENT DOCUMENTS

DE 102006018978 A1 * 11/2007 ....... B60G 17/01908
DE 102012217410 A1 * 4/2014
(Continued)

OTHER PUBLICATIONS

JPO machine translation of JP 2008-065087 (original JP document published Mar. 21, 2008).*

(Continued)

*Primary Examiner* — Behrang Badii
*Assistant Examiner* — David A Testardi
(74) *Attorney, Agent, or Firm* — Lorenz & Kopf, LLP

(57) ABSTRACT

A method for image-based vehicle localization includes measuring, at a vehicle, a position and a heading of the vehicle; capturing, at an image capture system of the vehicle, road surface image data of a road surface; processing the road surface image data to correct for distortion in the road surface image data due to pitch and roll of the vehicle; performing feature detection on the processed road surface image data to detect lane markers on the road surface; generating a local map based on the detected lane markers; wherein generating the local map comprises identifying a lane demarcated by the detected lane markers; and controlling the vehicle according to the local map.

17 Claims, 7 Drawing Sheets

Lane Marker Motion Model, 40MPH, 2 deg. turn

Lane Marker Motion Model, 80MPH, 0 deg. turn (51) Int. Cl.
*B60W 40/10* (2012.01)
*G01C 21/16* (2006.01)
*G06K 9/20* (2006.01)
*G06K 9/62* (2006.01)

(52) U.S. Cl.
CPC ..... *G06K 9/00208* (2013.01); *G06K 9/00798* (2013.01); *G06K 9/2018* (2013.01); *G06K 9/6293* (2013.01)

(58) Field of Classification Search
CPC ............. G05D 1/0274; G06K 9/00798; G06K 9/6293; G06T 2207/30256
See application file for complete search history.

(56) References Cited

U.S. PATENT DOCUMENTS

| | | | | |
|---|---|---|---|---|
| 6,591,000 | B1* | 7/2003 | Oike | G06K 9/00798 340/907 |
| 8,847,982 | B2* | 9/2014 | Kmiecik | G01C 11/02 345/420 |
| 9,081,383 | B1* | 7/2015 | Montemerlo | G08G 1/164 |
| 9,310,804 | B1* | 4/2016 | Ferguson | B60W 40/00 |
| 9,576,207 | B2* | 2/2017 | Chevalley | |
| 2002/0041229 | A1* | 4/2002 | Satoh | G05D 1/0246 340/438 |
| 2002/0095246 | A1* | 7/2002 | Kawazoe | G05D 1/0246 701/1 |
| 2007/0198146 | A1* | 8/2007 | Ikeda | G06T 7/12 701/23 |
| 2007/0219688 | A1* | 9/2007 | Gut | G08B 21/06 701/41 |
| 2008/0240505 | A1* | 10/2008 | Nakamura | G01C 21/26 382/103 |
| 2008/0240506 | A1* | 10/2008 | Nakamura | G01C 11/00 382/104 |
| 2008/0255724 | A1* | 10/2008 | Fechner | G06K 9/00798 701/33.4 |
| 2009/0118994 | A1* | 5/2009 | Mori | G06K 9/00798 701/117 |
| 2009/0169055 | A1* | 7/2009 | Ishikawa | G01C 21/32 382/104 |
| 2009/0228204 | A1* | 9/2009 | Zavoli | G01C 21/30 701/532 |
| 2009/0256692 | A1* | 10/2009 | Hadi | B60Q 5/00 340/435 |
| 2009/0265062 | A1* | 10/2009 | Nguyen Van | B62D 15/025 701/42 |
| 2010/0296700 | A1* | 11/2010 | Walter | G06K 9/00798 382/103 |
| 2011/0304734 | A1* | 12/2011 | Walter | G06T 1/00 348/148 |
| 2015/0260530 | A1* | 9/2015 | Stenborg | G01C 21/30 701/461 |
| 2015/0294161 | A1* | 10/2015 | Schamp | B60K 31/00 701/37 |
| 2015/0375680 | A1* | 12/2015 | Watanabe | B60R 1/00 701/36 |
| 2017/0061622 | A1* | 3/2017 | Sakano | B60R 1/00 |

FOREIGN PATENT DOCUMENTS

| | | | | |
|---|---|---|---|---|
| JP | 10040499 | A | * | 2/1998 |
| JP | 2000059764 | A | * | 2/2000 |
| JP | 2001331787 | A | * | 11/2001 |
| JP | 2005145402 | A | * | 6/2005 |
| JP | 2005149022 | A | * | 6/2005 |
| JP | 2005346304 | A | * | 12/2005 |
| JP | 2008065087 | A | * | 3/2008 ......... G06K 9/00704 |
| JP | 2010070012 | A | * | 4/2010 |
| JP | 2011022644 | A | * | 2/2011 |
| JP | 2012018531 | A | * | 1/2012 |

OTHER PUBLICATIONS

JPO machine translation of JP 2012-018531 (original JP document published Jan. 26, 2012).*

* cited by examiner

Lane Marker Motion Model, 40MPH, 2 deg. turn

Lane Marker Motion Model, 80MPH, 0 deg. turn

METHOD FOR IMAGE-BASED VEHICLE LOCALIZATION

CROSS-REFERENCE TO RELATED APPLICATIONS

This application claims the benefit of U.S. Provisional Application Ser. No. 62/191,796, filed on 13 Jul. 2015, the entirety of which is incorporated by this reference.

TECHNICAL FIELD

This invention relates generally to the vehicle localization field, and more specifically to new and useful methods for image-based vehicle localization.

BACKGROUND

Vehicle automation has been suggested as a means of increasing vehicle safety almost as long as cars have been in existence—experiments on autonomy in cars have been conducted since at least the 1920s. A number of computer technology enabled solutions have been proposed to address this pressing issue, but these solutions often suffer either from reliability concerns or infrastructure issues. To make the widest impact on driver (and passenger) safety, solutions to prevent or reduce the severity of accidents should be both robust to error and operable without significant changes in infrastructure. Thus, there is a need in the vehicle localization field to create methods for image-based vehicle localization. This invention provides such new and useful methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Six million: the number of auto accidents each year in America. Thirty-three thousand: the number of deaths resulting from these accidents. Ninety-three percent: the percentage of accidents in which human error is the primary cause. With these numbers, it's no surprise that auto accidents are the leading cause of death for Americans aged 4-34. The numbers don't lie; vehicle safety is a huge issue—and according to many, increasing vehicle intelligence is the best chance we have to solve this issue once and for all.

The inventions of the present application are directed to methods for image-based vehicle localization. These methods may increase the ability of drivers and vehicles to operate safely on the road, resulting in a safer driving experience not just for system adopters, but for drivers everywhere.

Figure 1:
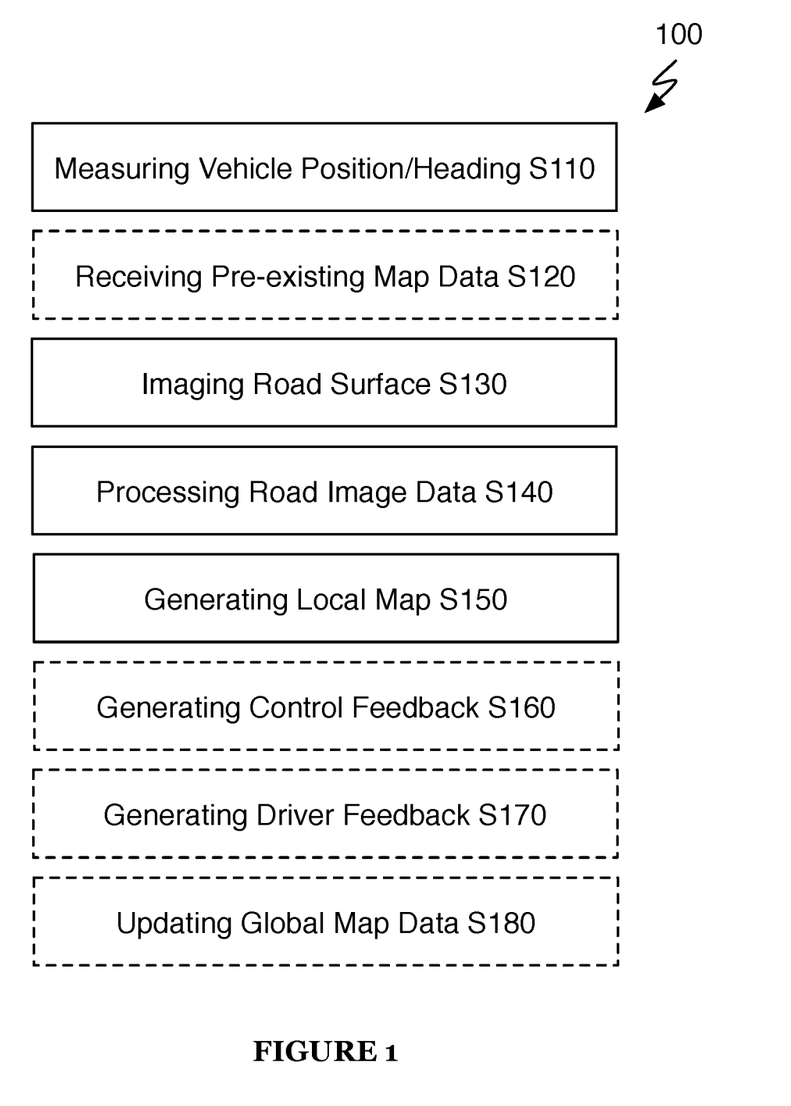
FIG. 1 is a chart representation of a method of a preferred embodiment.

As shown in FIG. 1, a method 100 for image-based vehicle localization includes measuring vehicle position and heading S110, imaging a road surface S130, processing road image data S140, and generating a local map S150. The method 100 may additionally or alternatively include receiving pre-existing map data S120, generating control feedback S160, generating driver feedback S170 and/or updating global map data S180.

The method 100 functions to enable localization of a vehicle relative to its surroundings (e.g., lane markers or other road surface markings) to increase safety, accuracy, and performance for driver assistance and vehicle automation systems.

The method 100 is preferably operable using an image capture and processing system coupled to a motor vehicle. The method 100 is preferably intended for implementation with mass-manufactured automobiles, but may additionally or alternatively be implemented in any suitable motor vehicle; for example, watercraft, light machinery, motorcycles, etc. In the present application, examples are presented under the assumption of implementation in an automobile. A person of ordinary skill in the art will recognize that the details of these examples may be modified for alternative implementations. The following paragraphs will assume operating of the method 100 in an image capture system coupled to an automobile (i.e., 'the car').

The image capture system operating the method 100 preferably includes a front-facing camera and a rear-facing camera, but may additionally or alternatively include only a single one of these cameras, additional cameras, and/or other image capture means. The image capture system preferably includes RGB visible light cameras, but may additionally or alternatively include any suitable image capture devices, including monochrome visible light cameras, infrared cameras, depth cameras, etc.

The image capture system preferably also includes a computing device for performing image processing, but may additionally or alternatively offload some or all computational duties to remote servers (e.g., in the cloud) or any other suitable computers.

The image capture system may be coupled to any sensors that may aid in or be relevant to vehicle localization, e.g., photodetectors, RADAR, SONAR, LIDAR, GPS, inertial measurement units (IMUs), microphones, strain gauges, pressure monitors, barometers, thermometers, altimeters, etc.

The image capture system may additionally or alternatively be coupled to any vehicle control systems aiding in vehicle automation, including steering, brake, and/or throttle interfaces.

The image capture system may additionally or alternatively be coupled to any user control interfaces (e.g., buttons, touchscreens, knobs, etc.).

S110 includes measuring vehicle position and heading. S110 preferably includes measuring vehicle position and heading using a Global Navigation Satellite System (GNSS) receiver (e.g., GPS receiver), but may additionally or alternatively include measuring vehicle position and/or heading in any manner.

S110 preferably includes measuring global position (e.g., latitude and longitude) but may additionally or alternatively include measuring relative position (e.g., distance and orientation relative to a real-time kinematic (RTK) GNSS base station, displacement from a radio tower, etc.).

S110 preferably includes measuring position using standard GNSS navigation techniques, but may additionally or alternatively include measuring position using RTK GNSS techniques, triangulation/trilateration techniques (e.g., using cellular towers), visual techniques (e.g., matching images to images with known locations), and/or any other suitable techniques. For example, S110 may include measuring position using dead-reckoning techniques (e.g., using accelerometer data to estimate change in position from a previous location with known position).

S110 preferably includes measuring heading using standard GNSS techniques, but may additionally or alternatively include measuring heading using a GNSS Compass technique (i.e., using two receivers separated by a known distance to generate heading), using a magnetic compass, using a gyrocompass, using an accelerometer, inferring heading from change in position, using visual data, and/or in any other manner.

S110 preferably includes measuring global heading (e.g., degrees from magnetic north) but may additionally or alternatively include measuring relative heading (e.g., heading relative to a roadway, heading relative to other cars, etc.).

In one example, S110 includes determining heading relative to a highway lane by measuring distortion of a road feature (e.g., a lane marker) as imaged by camera mounted on the vehicle. For example, angle of a lane marker may correspond to an angle of the vehicle relative to a road (or a lane in that road). S110 may additionally or alternatively include determining heading relative to any road feature, landmark, or other object.

S110 may additionally or alternatively include measuring vehicle velocity and/or speed. Step S110 preferably includes measuring speed by measuring position over time (e.g., as determined using GNSS methods), but may additionally or alternatively include measuring speed in any manner (e.g., by integrating acceleration as measured by the accelerometer over time, by querying a vehicle speedometer).

S120 includes receiving pre-existing map data. S120 functions to receive pre-existing data (i.e., data existing prior to execution of S120) describing the area the vehicle is traveling in.

Pre-existing map data may include any data relevant to an area around or near vehicle position. Pre-existing map data preferably includes a map of roads (e.g., the roads the vehicle is traveling on) with corresponding location information, but may additionally or alternatively include weather data, altitude data, point of interest data, etc. Pre-existing map data may additionally or alternatively include any information relevant to mapping; for example, pre-existing map data may include images of a road surface linked to locations along the road (e.g., a set of images taken at particular positions and orientations along the road) and/or LIDAR maps of a given area.

Pre-existing map data may be used for a number of purposes. For example, pre-existing map data may be used to aid in the generation of the local map (S150). In one example, pre-existing map data is used to provide a first estimate of location, which is then refined during generation of the local map. In this example, location may be estimated by, for instance, comparing image data to pre-existing image data (e.g., of a building, of the road surface, etc.) known to correspond to a particular location. Alternatively, pre-existing map data may be used to refine an estimate of location. For example, the method 100 may include receiving an initial estimate of position (e.g., via GPS), requesting and receiving pre-existing data corresponding to the position estimate (e.g., image data linked to positions within a region surrounding the position estimate), and using the pre-existing data (e.g., by comparing it to current road surface images and receiving the linked position data for matching images), providing a more accurate position estimate than via the first estimate alone. S120 may include processing data in any manner (e.g., there may not be a precise match between a road surface image and a pre-existing road surface image, but image warping techniques can be used to correct for differences in perspective; these techniques can also identify a correction to position from the position linked to the pre-existing road surface image based on the warping transformation required to match the perspective of the current road surface image).

Pre-existing map data may also be used to calibrate sensors. For example, a set of road surface images may be linked to a precisely known location. This map data may be used to calibrate a GPS receiver of the vehicle (i.e., when the vehicle image sensor captures an image substantially similar to one of the set of road surface images, the GPS receiver is calibrated using the precisely known location linked to that road surface image).

Pre-existing map data may be used for comparison purposes; for example, to track changes in an environment over time. Comparison of pre-existing map data to current map data may provide insight into myriad driving-related factors; for example, commercial/residential/industrial development, road surface conditions, weather conditions, traffic conditions, etc. For example, the method 100 may include comparing current data to pre-existing data to identify if a business has moved based on signs, building lighting, foot traffic, etc.

Pre-existing map data may also be used to supplement the local map. For example, pre-existing map data may be used as an alternative to local map data outside of a certain range (e.g., beyond a mile from the vehicle). As another example, pre-existing map data may be used to add information to the local map (e.g., gas station or other point of interest locations).

In one example, pre-existing map data is used in concert with image data from a rear-facing camera to provide predictions of local maps (e.g., lane markers) to the front of the vehicle. In this example, the rear-facing camera image data may be used (independently or with another localization technique such as GPS) to localize the vehicle (either globally or locally) and retrieve information about local maps (from pre-existing map data) in front of the vehicle (which can be used to navigate the vehicle within a lane, for instance). Alternatively, the rear-facing camera image data may be used with models that predict the lane boundaries in front of the vehicle. based on image data taken from the rear of the vehicle.

Pre-existing map data is preferably used when available, but may additionally or alternatively not be used (e.g., if GPS data is not available) for any reason.

S130 includes imaging a road surface. S130 functions to capture image data that may be used for vehicle localization purposes. S130 may additionally or alternatively include imaging other aspects of the vehicle's surroundings (e.g., other cars, street signs, buildings on the side of the road), image data of which may be used for vehicle localization, guidance, and/or other purposes. Note that image data as referred to throughout this specification may include any image and/or pseudo-image data as appropriate (e.g., RGB image data, infrared image data, LIDAR data, radar density estimate data, depth camera data, etc.).

Figure 2A:
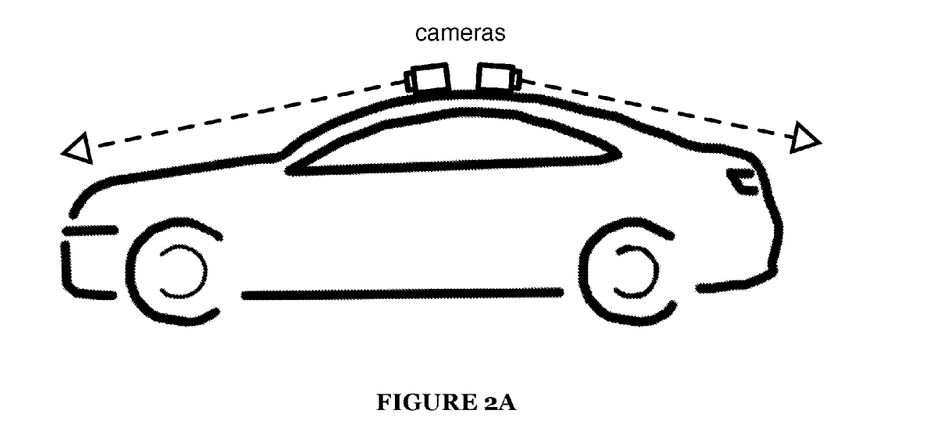
FIGS. 2A and 2B are diagram representations of camera mounting on a vehicle.
Figure 2B:
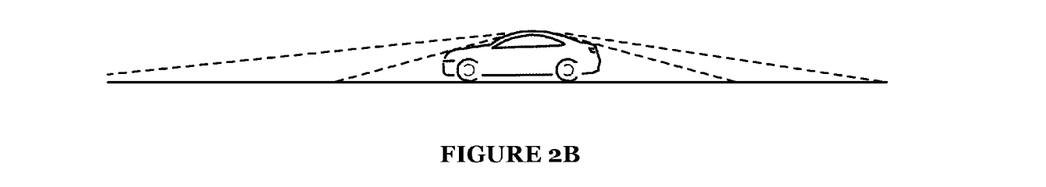

S130 preferably includes imaging the road surface with at least two cameras; one front-mounted camera and one rear-mounted camera, as shown in FIG. 2A and FIG. 2B. Additionally or alternatively, S130 may include imaging the road surface with any number of cameras mounted in any manner and location. Cameras are preferably configured (through positioning, focus, lens choice, etc.) to provide road surface image data for road surface between five and fifty feet from the vehicle; additionally or alternatively, cameras may capture road image data of road surfaces at any distance or range of distances from the vehicle.

S130 preferably includes capturing images at 30 frames per second or higher; alternatively, S130 may include capturing images at any rate. If S130 includes capturing images from multiple cameras, S130 may include synchronizing cameras to capture images at substantially same times; alternatively, cameras may be unsynchronized.

S130 preferably includes capturing visible light color images; additionally or alternatively, S130 may include capturing any manner of image (e.g., monochrome visible light, infrared, depth map, etc.).

S130 preferably includes capturing two-dimensional images, but may additionally or alternatively include capturing three-dimensional images (e.g., via stereo, assisted stereo, structured light, and/or time of flight techniques).

S140 includes processing road image data. S140 functions to transform road image data captured in S130 (potentially in combination with other data) into localization, guidance, and/or mapping data.

Figure 3:
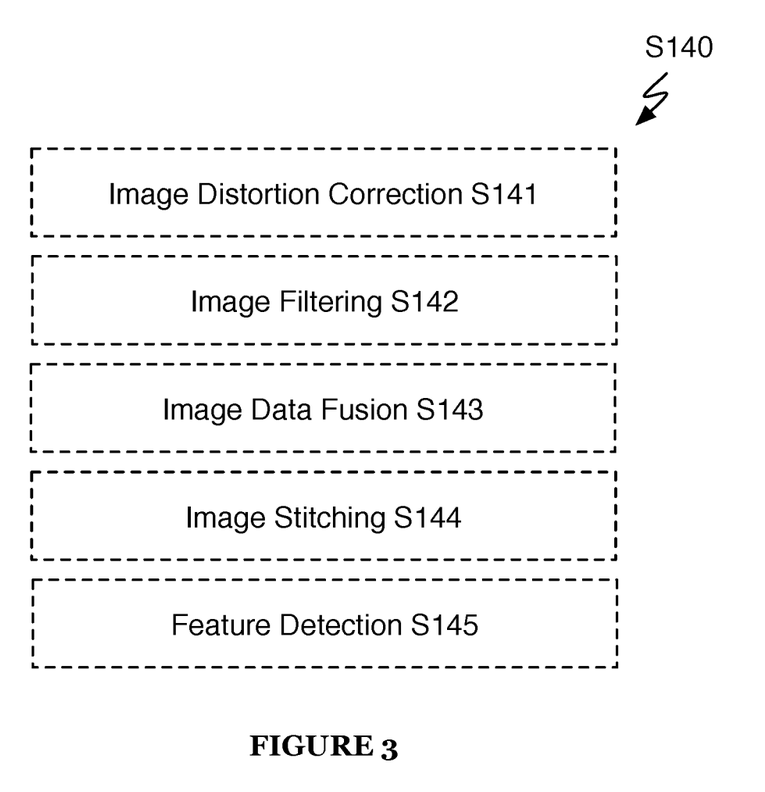
FIG. 3 is a chart representation of processing road image data of a method of a preferred embodiment.

S140 preferably includes one or more of performing image distortion correction S141, performing image filtering S142, performing image data fusion S143, performing image stitching S144, and performing feature detection S145, as shown in FIG. 3. S140 may additionally or alternatively include any other processing of road image data or related data.

S141 includes performing image distortion correction. S141 functions to transform image data in response to image distortion occurring from camera configuration (e.g., distortion from a wide-angle lens), vehicle motion, vehicle orientation, and/or other imaging system/environmental properties.

S141 preferably includes performing image distortion correction in order to increase accuracy of image-based localization and/or guidance; for example, if lane markers are imaged improperly, distance from the markers or orientation relative to the markers may be misjudged.

In one example, S141 is used to correct pitch and roll error; that is, image distortion due to vehicle roll (e.g., due to turning) or vehicle pitch (e.g., due to acceleration or braking). S141 may additionally or alternatively be used to correct any type of image distortion; e.g., image distortions due to lensing, reflection, refraction, sensor noise, and/or occlusions on camera lenses.

S141 may include performing image distortion correction with a number of techniques, including external-data-based techniques, model-based techniques, and/or multi-image-based techniques.

External-data-based techniques include techniques that make use of data external to image data to correct image data. For example, S141 may include performing pitch/roll correction for images based on data from an inertial measurement unit (IMU) or on other data that may be correlated to pitch and/or roll (e.g., acceleration/deceleration as measured by a GPS receiver or by internal vehicle sensors).

Figure 4:
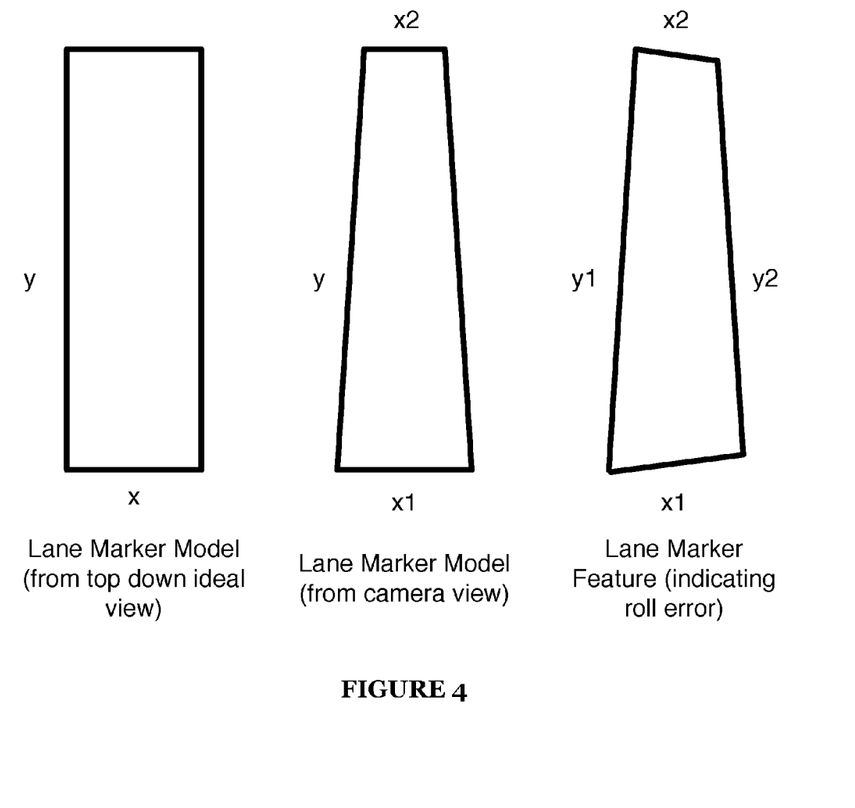
FIG. 4 is an example representation of model matching techniques of a method of a preferred embodiment.

Model-based techniques include techniques that make use of image models; that is, sets of data that describe how an image (or features within an image) should look. For example, a model for lane markers may include parameters for the shape of lane markers as well as for camera configuration and location. If an imaged lane marker deviates from the model, this may be an indication of image distortion, as shown in FIG. 4.

Model-based techniques may include comparing image data to static models (e.g., static lane marker proportion data) or to dynamic models (e.g., models developed or updated by machine learning techniques).

Model-based techniques may take as input any number of parameters, for instance, an example dynamic model may take as input an estimated pitch and roll (e.g., from an IMU), and refine the pitch and roll estimates through a minimization process (or other optimization process) operating on an imaged lane marker and the output of the model (e.g., the first estimate of pitch and roll is the starting point for the model, and the model iteratively refines the pitch and roll estimates to make the model output most closely match the detected feature).

Multi-image techniques include techniques that make use of multiple images to perform distortion correction. While the previous techniques may be used on single or multiple images, multi-image techniques are specifically techniques that rely on the relationship between images captured at successive times in order to perform image correction. For example, multi-image techniques may include averaging over several image frames to remove small pitch/roll errors. As another example, multi-image techniques may include comparing portions of an image to a successive image; rapid, large changes in an image may be an indication of distortion or sensor error.

Figure 5:
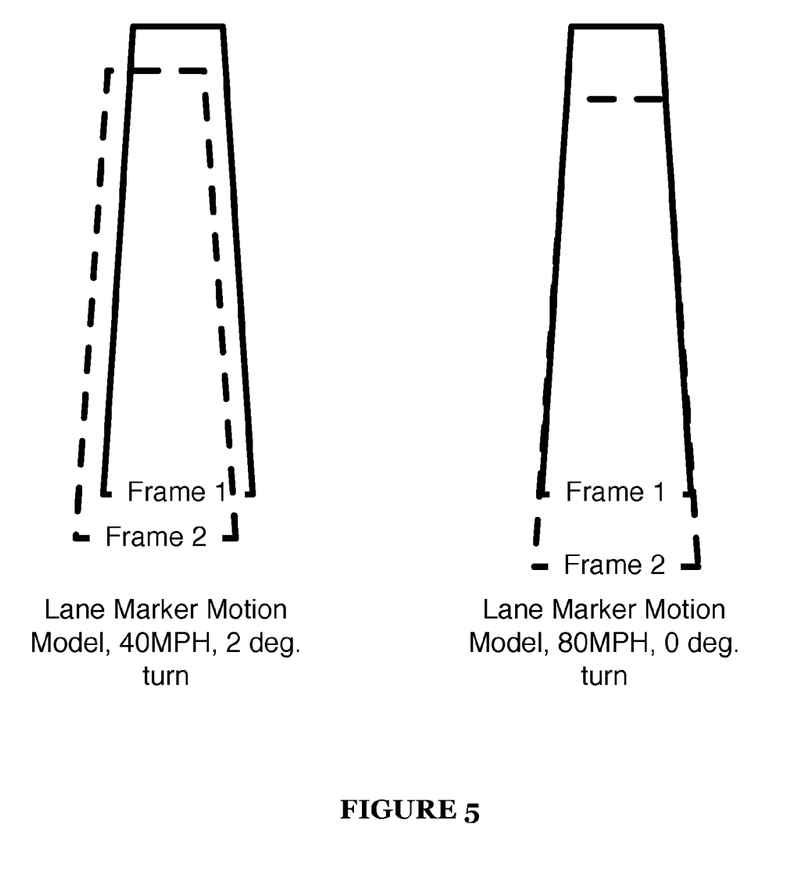
FIG. 5 is an example representation of model matching techniques of a method of a preferred embodiment.

S141 may include performing image distortion correction from any combination of techniques; for example, S141 may include correcting image distortion based on a model that describes lane marker motion (as detected over multiple image frames) based on external data. In this example the model may expect lane markers to be transformed in a particular way across image frames based on the detected speed of the vehicle, steering wheel position (or other measure of orientation, such as wheel angle of the wheels used to steer the car) and the frame rate of the camera, as shown in FIG. 5.

In some examples, a dynamic model used can calculate an expected time distortion contribution; i.e., how much it is expected that model output will change over time based on some parameters, such as vehicle speed, steering wheel angle, vehicle wheel angle, accelerometer data, etc.

S141 preferably includes transforming images to correct image distortion, but may additionally or alternatively include simply generating data describing distortion present in an image and/or possible corrections. For example, a distorted image may be processed by appending or linking a dataset describing distortions present within the image without modifying the original image data.

S141 may be performed at any time using any suitable image data, depending on the technique used. For example, an averaging technique may be performed on raw image data immediately after image capture. As another example, a technique that performs image distortion correction based on lane marker models may be performed after feature detection (which may identify lane markers within images).

In some cases, S141 may be performed concurrently with or as part of other tasks (e.g., distortion may be corrected for as part of a minimization algorithm for performing vehicle localization in S150).

S142 includes performing image filtering. S142 functions to enable removal (or ignorance) of undesired features, properties, or occlusions within images. For example, S142 may include detecting a non-road-surface (e.g., a car) in a rear-view camera and filtering out that surface from the image (e.g., by designating that the road-surface feature detector ignore that section of the image). S142 may include performing any type of image filtering; for example, S142 may include performing optical flow filtering to identify objects within camera view that are traveling at non-zero speed relative to the road surface (e.g., a car, a moving object in the road, etc.).

S143 includes performing image data fusion. S143 functions to fuse image data from multiple sensors to produce new image data; for example, S143 may include using stereo techniques to generate depth information from two front-mounted cameras. As another example, S143 may include correlating LIDAR range data to a 2D visible light image to generate 3D image data. As a third example, S143 may include fusing an infrared image and a visible light image to form a hyperspectral image. As a fourth example, S143 may include averaging image data between two cameras placed closely together (e.g., to reduce sensor noise). S143 may include performing image fusion in any manner.

S144 includes performing image stitching. S144 functions to combine multiple image frames to generate a larger image. This larger image may be useful in generating a local map (as in S150).

S144 preferably includes performing image stitching based on one or a combination of pixel matching, feature matching, and external-data-based alignment.

Pixel matching refers to an image stitching technique that aligns images based on an algorithm that attempts to minimize the difference in pixel values in overlapping image regions. Feature matching refers to an image stitching technique that includes performing feature detection (as in S145) and aligning images based on detected features. External-data-based alignment refers to using non-image data to perform alignment; for example, an overlap between two images taken successively may be estimated using change in vehicle position (e.g., as measured by velocity) between the two images. External-data-based alignment, if used, is preferably used as a first estimate for other image stitching techniques (but may additionally or alternatively be used in any manner).

S144 is preferably performed substantially in real-time, but may additionally or alternatively be performed at any time (e.g., in some cases it may be used for global map generation but not for local map generation). S144 is preferably performed using temporally successive images, but may additionally or alternatively be used with images of a location taken in the past. For example, if a panorama of road surface is desired but a particular piece of image data is missing, image data taken at previous times may be used to fill in gaps (or for any other purpose).

S144 may be performed per camera (i.e., image stitching occurs for images taken from one perspective) but may additionally or alternatively be performed across cameras (i.e., image stitching occurs for images taken from multiple cameras and/or perspectives). In some cases, a rear-facing camera may be used to provide image data for localization and/or navigation as a supplement or as a replacement to image data from a front-facing camera (e.g., if the front-facing image is washed out due to lighting conditions).

In some cases, S144 may be performed concurrently with or as part of other tasks (e.g., feature detection of S145 may be used to perform image stitching).

S145 include performing feature detection. S145 functions to detect features present in image data captured in S130. S145 preferably includes detecting lane markers on road surfaces, but may additionally or alternatively include detecting any image feature (e.g., cars, street signs, potholes, reflections, etc.).

Features detected by S145 are preferably used to aid in generating the local map of Step S150, but may additionally or alternatively be used in any other manner (e.g., in correcting for pitch/roll error).

In one embodiment, S145 includes performing feature detection for lane markers using multiple binary feature detectors.

For example, S145 may include, for each pixel in an image (or for a subset of pixels; e.g., pixels above some absolute threshold intensity or pixels in an area of interest), measuring difference in intensity between the pixel and a pixel some number of pixels to the left. This distance (i.e., the number of pixels) will henceforth be referred to as $d_x$. $d_x$ preferably corresponds to the width of a lane marker as imaged by the camera (e.g., a number of pixels corresponding to a width of 4-6 inches). If the intensity difference passes a threshold value (preferably corresponding to the difference in intensity between road surface and lane marker paint), the feature is detected; that is, the pixel is identified as potentially belonging to a lane marker. This process is preferably also performed based on the difference in intensity between the pixel and another pixel; this other pixel located a distance of $d_x$ to the right. Note that the pixel distance $d_x$ is preferably computed using a transformation that accounts for the parameters of the imaging system (e.g., the 6-axis position and orientation of the imaging system relative to the vehicle and relative to the road surface); for example, at the bottom of an image (i.e., closest to the vehicle for a downward angled camera), $d_x$ for a lane marker width of four inches may be 200 pixels, while in the middle of the image (depending on, for example, the angle of the road surface relative to the camera), $d_x$ for a lane marker width of four inches may be only 50 pixels.

Further note that intensity differences may be signed (e.g., potentially causing the feature detector operating on a white pixel with a black pixel $d_x$ away may result in a true value, but operating on a black pixel with a white pixel $d_x$ away may result in a false value) or unsigned.

The method 100 may additionally or alternatively include modifying the feature detectors to account for changing road surface slope (i.e., grade); for example, the method 100 may determine from one set of local image data (e.g., LIDAR) that road slope changes within the imaging view (e.g., of an RGB camera) and may calculate $d_x$ based not just on position within the imaging view, but also on known road slope (or road slope change).

In this example, S145 may include repeating this process for distances of $2d_x$ to the left and the right (or any other distance value). In this case, the different distances may be assigned different confidence levels; that is, the $2d_x$ process may be more likely to detect lane marker pixels, but may also be more likely to generate false positive results (than the $d_x$ process). Further, S145 may include using a vertical feature detector (in contrast to the horizontal detectors described in the preceding two paragraphs) to provide additional confidence to feature detection; for instance, a set of pixels that satisfy the horizontal feature detection constraints may be eliminated if they are not vertically near other pixels satisfying those constraints (the vertical axis of the image corresponding to the direction of travel of the car). From these feature detectors, a set of binary maps may be generated for both $d_x$ and $2d_x$, which may then be used in local map generation.

Note that for multiple feature detectors (operating with multiple 'width' parameters as described above), it may be possible to generate scaled pixel 'widths' simply by scaling the first generated pixel width (as opposed to scaling the actual width and calculating the transformed pixel width directly for each width). Alternatively, pixel widths may be generated in any manner.

Figure 6:
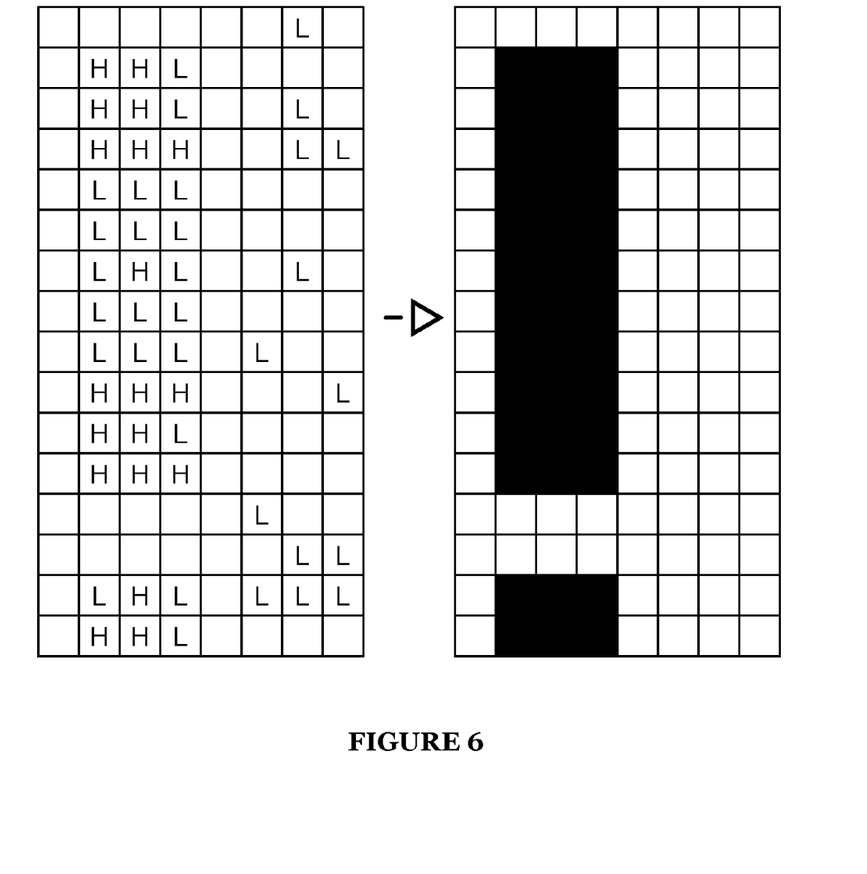
FIG. 6 is an example representation of feature detection techniques of a method of a preferred embodiment.

S145 may additionally or alternatively include using region-growing techniques to identify features. For example, the two binary maps discussed above may be merged using a region-growing technique, wherein areas of low-confidence pixels are only considered as feature areas if they couple or overlap with areas of high confidence pixels, as shown in FIG. 6.

S145 may include detecting image features using any other suitable feature detection techniques (e.g., color matching, edge/corner/blob detectors, machine-learning-based techniques). Image feature detection techniques need not necessarily be binary (e.g., in the $d_x$ example, a pixel could receive a scaled score based on intensity difference rather than a binary value).

In one example, S145 includes generating expected features (e.g., expected lane markers at particular locations) based on previously captured data (e.g., recently captured road surface data or the 'pre-existing data' received in S120). These predicted features may in turn be used to more efficiently search for features in S140.

The parameters of feature detection may vary based on external parameters. For example, S145 may include lowering feature detection thresholds if it is cloudy outside (e.g., as determined by weather, a photodetector, etc.). This may be determined, for example, by measuring the average intensity of an image. As another example, S145 may include altering feature detection thresholds based on vehicle speed.

S150 includes generating a local map. S150 functions to create a map of features in proximity to a vehicle. S150 preferably includes generating a local map of lanes in front of a vehicle to aid in assisted cruise control, but may additionally or alternatively generate local map data of any features for any purpose.

For example, S150 may include imaging road surface near the vehicle and correlating this to a global map (e.g., via latitude and longitude) so that road surface images may be used to supplement GPS data on future trips (or for other cars, etc.). Note that the term "global map" here refers to a map of features (or any other map) extending beyond a certain proximity of the vehicle; for example, a city street map. Global maps are preferably referenced to a fixed point, while local maps are preferably referenced to the vehicle. Additionally or alternatively, global and local maps may be referenced to any coordinates (or may be referenced in any other manner).

S150 preferably includes generating a local map of road features (e.g., lanes) from features detected in images captured by S130, but may additionally or alternatively include generating a local map using any suitable data. For example, S150 may include generating a local map based on a combination of image data and GPS data (and/or IMU data).

In one example of an invention embodiment, S150 includes identifying a lane demarcated by detected lane markers (e.g., by interpolating between lane markers).

S150 preferably includes generating local map data by converting pixel offsets into distances (using known camera configuration parameters, 3D imaging techniques, or any other suitable method).

S150 preferably includes generating local map data in a manner robust to pitch/roll error. For example, S150 may include generating a local map starting from the bottom of the image frame (that is, the area of the image frame closest to the vehicle), which is generally less susceptible to pitch error. S150 may additionally or alternatively include integrating other techniques for reducing pitch/roll/yaw error (such as those described previously).

In one example, S150 includes generating a local map identifying a lane by computing estimated lane boundaries for several successive (or otherwise captured-close-in-time) image data frames and determining the lane boundaries (relative to the vehicle) from an average of the multiple lane boundary estimates.

In one example, S150 includes generating a local map using a Kalman filter operating on processed image data and GPS receiver data. S150 may additionally or alternatively include generating a local map using any suitable technique, such as utilizing one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the method 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the method 100. Further, any suitable model (e.g., machine learning, non-machine learning, etc.) can be used in generating local maps and/or other data relevant to the method 100.

S150 may additionally or alternatively include generating a local map based on local map models. For example, local map generation may be constrained by known road standards (e.g., maximum allowed curvature of a highway, known turning radii, lane marker separation requirements).

Figure 7:
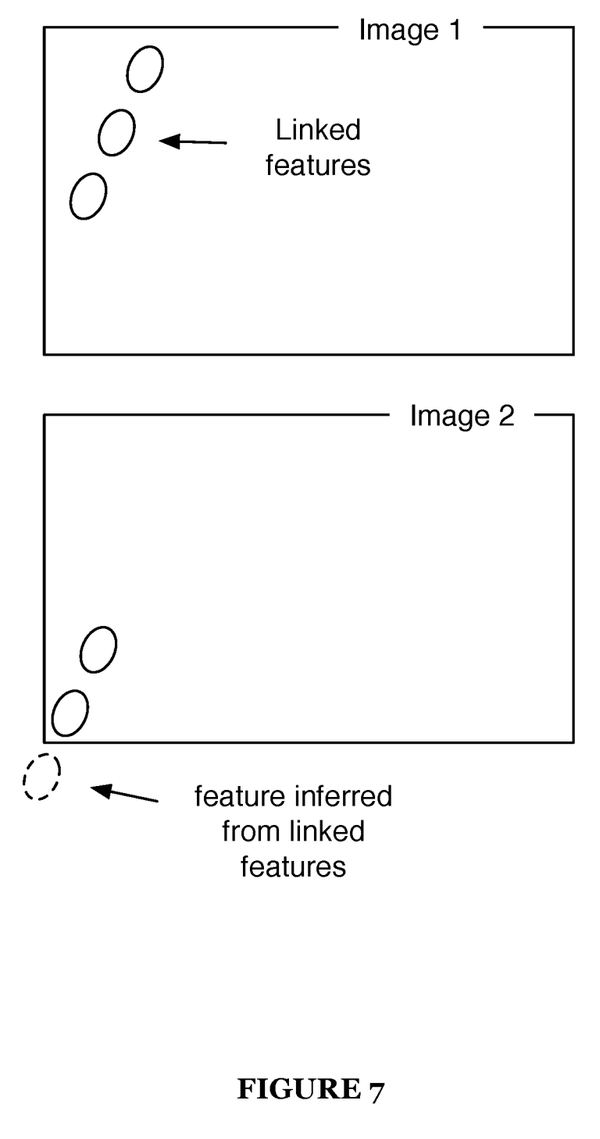
FIG. 7 is an example representation of feature linking of a method of a preferred embodiment.

S150 may additionally or alternatively include linking local map features. For example, features (e.g., lane markers) may be linked to each other, allowing their presence, location, and/or shape to be inferred as shown in FIG. 7. This may be used, for instance, to allow lane markers to be inferred even if they are occluded (e.g., by a car) or otherwise difficult to detect (e.g., due to lighting issues). Lane markers may be inferred or linked in any manner (e.g., using a model of lane markers that includes separation between lane markers, allowing probably lane marker locations to be generated based on detected lane markers).

In some cases, S150 include generating different local maps for different imaging areas (e.g., corresponding to differing distances). For example, S150 may include mapping multiple road features for distances less than 30 feet, while only mapping lane markers (or inferring lane markers) for distances greater than 30 feet from the vehicle.

S160 includes generating control feedback. S160 preferably includes generating control values for an automated or assisted driving system based on the local map of S150 (and/or any other data produced by the method 100). For example, S160 may include controlling vehicle steering, acceleration, and/or braking to keep a vehicle in a particular lane and/or avoid obstacles/vehicles on a road. In one example, S160 includes generating control feedback as described in U.S. Provisional Patent Application No. 62/159,494, the entirety of which is incorporated by this reference. S160 may include generating any other feedback used to control the vehicle.

S170 includes generating driver feedback. S170 functions to generate feedback for a driver (e.g., audio feedback, video feedback, tactile feedback) based on the local map of S150 (and/or any other data produced by the method 100). For example, S170 may include displaying (on an LCD or other display) a visualization of the vehicle's location within a lane (and potentially obstacles identified in the vehicle's surroundings). As another example, S170 may include providing audio status updates for an assisted cruise control system (e.g., "System engaged", "system disengaged", "obstacle ahead").

S180 includes updating global map data. S180 functions to update global map data (e.g., map data as described in S120) based on local map data. For example, S180 may include correcting lane location data for a street map (intended to be used by GPS receivers) based on changes in lane marker location as detected in image data (as captured in S130). As another example, S180 may include generating a global map correlating position to image data based on an aggregate of multiple image data sources (e.g., the GPS readings and image data of many cars passing through the same area), potentially allowing navigation to be performed by image detection alone using the global map. S180 may additionally or alternatively include updating, supplementing, modifying, and/or replacing any map data in any manner.

The method of the preferred embodiment and variations thereof can be embodied and/or implemented at least in part as a machine configured to receive a computer-readable medium storing computer-readable instructions. The instructions are preferably executed by computer-executable components preferably integrated with a vehicle image processing system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for image-based localization of a vehicle, comprising:
   capturing, at an image capture system of the vehicle, road surface image data of a road surface;
   processing, by a dynamic model, a vehicle speed and a vehicle wheel angle to determine an expected time distortion contribution;
   performing, by the dynamic model, feature detection on the road surface image data to detect lane markers on the road surface based on an estimated pitch of the vehicle, an estimated roll of the vehicle, and the expected time distortion contribution;
   generating a local map comprising a lane demarcated by the detected lane markers; and
   controlling the vehicle according to the local map.

2. The method of claim 1, further comprising retrieving pre-existing map data based on a position and a heading of the vehicle, and wherein the performing the feature detection is based on the pre-existing map data.

3. The method of claim 2, wherein the pre-existing map data includes a set of pre-existing road surface images that are linked to a set of known locations.

4. The method of claim 2, wherein the performing feature detection further comprises generating expected lane marker locations from the the pre-existing map data and using the expected lane marker locations to aid in the feature detection of lane markers on the road surface.

5. The method of claim 1, wherein the generating the local map comprises computing a set of estimated lane boundaries, each of the set generated from road surface image data captured at different times, and identifying the lane from an average of the set of estimated lane boundaries.

6. The method of claim 1, further comprising generating the estimated pitch and the estimated roll using an inertial measurement unit coupled to the vehicle.

7. The method of claim 1, wherein the feature detection comprises detecting the lane markers using multiple binary feature detectors operating on pixels of the road surface image data.

8. A method for image-based localization of a vehicle, comprising:
   capturing, at an image capture system of the vehicle, road surface image data of a road surface;
   processing the road surface image data to correct for distortion in the road surface image data due to an estimated pitch and an estimated roll of the vehicle, resulting in processed road surface image data;

performing feature detection using multiple binary feature detectors operating on pixels of the processed road surface image data to detect lane markers on the road surface;

generating a local map comprising a lane demarcated by the detected lane markers; and controlling the vehicle according to the local map, wherein a first binary feature detector of the multiple binary feature detectors returns a true value for a first pixel if an intensity difference between the first pixel and a second pixel is greater than a first threshold value and a false value for the first pixel otherwise, wherein the first pixel and second pixel are separated by a transformed lane marker width, and wherein the method further comprises generating the transformed lane marker width from an expected lane marker width and the location of the first pixel within the road surface image data.

9. The method of claim 8, wherein a second binary feature detector of the multiple binary feature detectors returns a true value for the first pixel if an intensity difference between the first pixel and a third pixel is greater than a second threshold value and a false value for the first pixel otherwise, wherein the first pixel and third pixel are separated by a doubled transformed lane marker width, and wherein the method further comprises generating the doubled transformed lane marker width by doubling the transformed lane marker width.

10. The method of claim 9, further comprising generating a first binary map using the first binary feature detector, generating a second binary map using the second binary feature detector, and combining the first and second binary maps.

11. The method of claim 9, wherein the combining the first and second binary maps comprises merging the first and second binary maps using a region-growing technique, and wherein the merging the first and second binary maps comprises including regions of true values of the second binary map if and only if the regions couple or overlap with regions of true values of the first binary map.

12. The method of claim 11, wherein the region-growing technique is initiated at pixels of the road surface image data corresponding to a smallest distance from the image capture system.

13. The method of claim 8, further comprising modifying the first threshold value based on environmental conditions of an environment external to the vehicle.

14. The method of claim 13, wherein the modifying the first threshold value based on environmental conditions comprises scaling the first threshold value based on an average intensity of the road surface image data.

15. A system for image-based localization of a vehicle, comprising:
an image capture system configured to capture road surface image data of a road surface;
a computer readable medium that stores a dynamic model that is configured to, by a processor, process a vehicle speed and a vehicle wheel angle to determine an expected time distortion contribution, and perform feature detection on the road surface image data to detect lane markers on the road surface based on an estimated pitch of the vehicle, an estimated roll of the vehicle, and the expected time distortion contribution;
a controller configured to generate a local map comprising a lane demarcated by the detected lane markers, and control the vehicle according to the local map.

16. The system of claim 15, further comprising an inertial measurement unit that provides the estimated pitch of the vehicle and the estimated roll of the vehicle.

17. The system of claim 15, wherein the computer readable medium that stores pre-existing map data that includes a set of pre-existing road surface images that are linked to a set of known locations, and wherein the feature detection is based on the pre-existing road surface images.

* * * * *